US012263434B2

(12) United States Patent
Bartelt et al.

(10) Patent No.: US 12,263,434 B2
(45) Date of Patent: Apr. 1, 2025

(54) SEPARATING APPARATUS FOR SEPARATING LIQUID FROM GAS, IN PARTICULAR AIR, AND SEPARATING SYSTEM OF A MACHINE (71) Applicant: MANN+HUMMEL GmbH, Ludwigsburg (DE)

(72) Inventors: Bertram Bartelt, Steinheim (DE); Peter Biebricher, Mannheim (DE); Klemens Dworatzek, Edingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 428 days.

(21) Appl. No.: 17/723,110

(22) Filed: Apr. 18, 2022

(65) Prior Publication Data

US 2022/0233988 A1    Jul. 28, 2022

Related U.S. Application Data (63) Continuation of application No. PCT/EP2020/079568, filed on Oct. 21, 2020.

(30) Foreign Application Priority Data

Oct. 21, 2019   (DE) .................... 10 2019 128 397.3

(51) Int. Cl.
*B01D 53/22*    (2006.01)
*B01D 46/00*    (2022.01)
*B01D 46/24*    (2006.01)

(52) U.S. Cl.
CPC ..... *B01D 46/0031* (2013.01); *B01D 46/2403* (2013.01)

(58) Field of Classification Search
CPC ...................... B01D 46/0031; B01D 46/2403
See application file for complete search history.

(56) References Cited

U.S. PATENT DOCUMENTS 3,318,071 A * 5/1967 Sinex .................. B01D 53/26
96/184
3,386,230 A   6/1968 Riesberg et al.
(Continued)

FOREIGN PATENT DOCUMENTS

DE     102013020499 A1    6/2015
WO     WO-2015086376 A1 *  6/2015 ............ B01D 29/11
WO     2019/024991 A1     2/2019

OTHER PUBLICATIONS

WO2015086376 Machine translation (Year: 2015).*

*Primary Examiner* — Anthony R Shumate (57) ABSTRACT

A separating apparatus for separating liquid from gas has a housing with a connection device for connecting to a connection head of a machine along a connection axis. The housing has a gas inlet and a gas outlet surrounding the connection axis. A separating medium inside the housing separates gas inlet from gas outlet. A liquid collection chamber inside the housing at a clean gas side surrounds connection axis and gas outlet. A liquid drain leads out of the liquid collection chamber. Gas outlet and liquid drain lead out of the housing at a side provided with the connection device. A pipe section arranged inside the housing surrounds circumferentially the connection axis and forms at least partially a radially inner boundary of the liquid collection chamber. The pipe section leads to the gas outlet. The pipe section is functionally separated from mechanical force-transmitting connection elements of the connection device.

13 Claims, 5 Drawing Sheets (56) References Cited

U.S. PATENT DOCUMENTS

| | | | | |
|---|---|---|---|---|
| 4,356,093 | A | * | 10/1982 | Abercrombie, Jr. .... B03C 1/027 |
| | | | | 210/918 |
| 4,632,682 | A | | 12/1986 | Erdmannsdorfer |
| 5,217,627 | A | * | 6/1993 | Pall ..................... A61M 1/0209 |
| | | | | 604/6.02 |
| 6,024,226 | A | * | 2/2000 | Olivier ..................... B03B 5/42 |
| | | | | 209/172.5 |
| 11,161,071 | B2 | | 11/2021 | Bartelt et al. |
| 2001/0027948 | A1 | * | 10/2001 | Tipton ................... C02F 3/301 |
| | | | | 210/903 |
| 2002/0179545 | A1 | * | 12/2002 | Rosenberger .......... B01D 65/02 |
| | | | | 210/806 |
| 2003/0017142 | A1 | * | 1/2003 | Toner ................. A61M 1/3472 |
| | | | | 435/370 |
| 2010/0000412 | A1 | | 1/2010 | Heikamp |
| 2011/0108014 | A1 | * | 5/2011 | Schleiden ............. B01D 45/06 |
| | | | | 123/573 |
| 2012/0167534 | A1 | | 7/2012 | Karlheinz et al. |
| 2013/0099552 | A1 | * | 4/2013 | Enkhbold ............... B03B 9/005 |
| | | | | 299/8 |
| 2022/0238042 | A1 | * | 7/2022 | Mokhtari ............... C12M 23/16 |
| 2022/0314201 | A1 | * | 10/2022 | Raedts ................. B01F 35/712 |

* cited by examiner

SEPARATING APPARATUS FOR SEPARATING LIQUID FROM GAS, IN PARTICULAR AIR, AND SEPARATING SYSTEM OF A MACHINE

CROSS-REFERENCE TO RELATED APPLICATIONS

This application is a continuation application of international application No. PCT/EP2020/079568 having an international filing date of 21 Oct. 2020 and designating the United States, the international application claiming a priority date of 21 Oct. 2019 based on prior filed German patent application No. 10 2019 128 397.3, the entire contents of the aforesaid international application and the aforesaid German patent application being incorporated herein by reference.

BACKGROUND OF THE INVENTION

The invention concerns a separating apparatus for separating liquid from gas, in particular air, with a housing which comprises
- a connection device with which the separating apparatus can be connected separably by means of a rotation and/or insertion movement in relation to a virtual connection axis to a connection head of a machine,
- at least one gas inlet for the gas to be freed from liquid,
- at least one gas outlet for the gas freed from liquid, which surrounds the connection axis circumferentially,
- and at least one liquid drain for separated liquid,
- wherein in the housing at least one separating medium through which the gas can flow is arranged which separates the at least one gas inlet in relation to the gas flow from the at least one gas outlet,
- wherein the at least one gas outlet and the at least one liquid drain lead out of the housing at the side where the connection device is arranged,
- wherein the at least one liquid drain leads out of a liquid collection chamber which is arranged at a clean gas side of the separating medium and which circumferentially surrounds the connection axis and the at least one gas outlet,
- wherein in the housing interior of the housing a pipe section leads to the at least one gas outlet and surrounds circumferentially the connection axis and at least partially forms a radially inner boundary of the liquid collection chamber.

Moreover, the invention concerns a separating system of a machine
- with at least one separating apparatus for separating liquid from gas, in particular air, with a housing which comprises
- a connection device with which the separating apparatus can be connected separably by means of a rotation and/or insertion movement in relation to a virtual connection axis to a connection head of a machine,
- at least one gas inlet for the gas to be freed from liquid,
- at least one gas outlet for the gas freed from liquid, which surrounds the connection axis circumferentially,
- and at least one liquid drain for separated liquid,
- wherein in the housing at least one separating medium through which the gas can flow is arranged which separates the at least one gas inlet in relation to the gas flow from the at least one gas outlet,
- wherein the at least one gas outlet and the at least one liquid drain lead out of the housing at the side where the connection device is arranged, —wherein the at least one liquid drain leads out of a liquid collection chamber which is arranged at a clean gas side of the separating medium and which circumferentially surrounds the connection axis and the at least one gas outlet,
- wherein in the housing interior of the housing a pipe section leads to the at least one gas outlet and surrounds circumferentially the connection axis and at least partially forms a radially inner boundary of the liquid collection chamber,
- and with a connection head, at which a connection socket is arranged that is separably connected to the connection device of the separating apparatus, for connecting the at least one separating apparatus.

DE 10 2014 000 281 A1 discloses a device, for example, an oil separator or a fuel filter, for separating liquid from air. The device has a cup-shaped housing with a filter element arranged therein and embodied as an annular coalescer, for example, a so-called spin-on filter. For closing its open end face, the cup-shaped housing comprises a housing cover. This housing cover comprises an opening for discharging the filtered clean air. In the opening, a nipple is received which extends through the housing cover in the direction of the longitudinal axis of the cup-shaped housing. The housing cover is detachably connectable to the nipple. The region of the housing cover detachably connectable to the nipple is designed such that in the connected state of the housing cover with the nipple between housing cover and nipple at least one liquid drain, for example, an oil passage channel or connection channel, is arranged for discharging the separated liquid out of the interior of the cup-shaped housing. For supply of raw air into the cup-shaped housing, the housing cover comprises at least one raw air inlet arranged off-center. For discharging the clean air from the cup-shaped housing, the nipple comprises a central clean air outlet that is formed as one piece together with the nipple.

The invention has the object to configure a separating apparatus and a separating system of the aforementioned kind in which a connection between the separating apparatus and the connection head can be realized in a simpler way. In particular, a mounting and/or component-related expenditure during exchange of the separating apparatus is to be reduced.

SUMMARY OF THE INVENTION

This object is solved for the separating apparatus in that the pipe section is separated functionally from mechanical force-transmitting connection elements of the connection device.

According to the invention, the pipe section in relation to a mechanical force transmission is realized separate from the actual connection device. In this way, the function of delimiting the liquid collection chamber relative to the at least one gas outlet can be functionally separated from the holding function of the connection device for holding the separating apparatus at the connection head. In contrast thereto, in the device known from the prior art, the respective nipple is provided as a pipe piece within the container interior for separating the gas outlet from the liquid collection chamber and outside of the container for screwing into the connection head of the machine. By means of the separation of these two functions according to the invention, a connection socket on the part of the connection head can also be designed to be correspondingly shorter. The head-side connection element must only extend into a connection receptacle on the part of the housing of the separating apparatus according to the invention. The required installation space on the part of the connection head can thus be reduced. In this way, the separating apparatus can be more easily mounted.

The at least one gas outlet surrounds the connection axis circumferentially. In this manner, the at least one gas outlet can be centrally arranged in relation to the connection axis.

The pipe section surrounds the connection axis circumferentially and forms a radially inner boundary of the liquid collection chamber at least partially. By means of the pipe section, it can be prevented that separated liquid that collects in the liquid collection chamber can flow into the at least one gas outlet and contaminate again in this way the clean gas that has already been freed from liquid.

The at least one gas outlet and the at least one liquid drain lead out of the housing at the side at which the connection device is arranged. In this manner, the at least one gas outlet and the at least one liquid drain can be connected by means of the connection device more easily with a corresponding gas discharge channel or a corresponding oil drain channel on the part of the connection head.

Advantageously, the housing can comprise an in particular cup-shaped housing pot. The open side of the housing pot can be closed with a housing cover. The housing cover, after installation of the at least one separating medium, can be connected to the housing pot so as to be separable only destructively. Preferably, housing and housing cover are of metal, preferably sheet steel.

Advantageously, the housing cover can be connected by means of a crimp connection, in particular by means of a connection plate, to the housing pot. In this manner, a simple, fluid-tight, and stable connection between the housing cover and the housing pot can be realized. Instead of a crimp connection, a weld connection can be used.

Advantageously, at least one part of the connection device can be realized at the housing cover. In this manner, corresponding mechanical forces when connecting the separating apparatus with a connection head can be absorbed substantially by the housing cover. The housing pot and the at least one separating medium contained therein can thus be relieved of the corresponding mechanical forces which act between the separating apparatus and the connection head. In this manner, the requirements in regard to the mechanical stability of the housing pot and of the at least one separating medium can be reduced accordingly.

Advantageously, at least one sealing device for sealing of fluid-conducting regions in the housing and between the housing and the connection head can be arranged at the housing, in particular the housing cover. The at least one sealing device can be activated automatically upon connecting the separating apparatus to the connection head.

The separating apparatus can be separably connected by means of a rotation and/or insertion movement in relation to a virtual connection axis to the connection head of a machine. In this context, this can be a pure rotation movement, a pure insertion movement or a combined rotation/insertion movement. Combined rotation/insertion movements are carried out in particular in screw connections or bayonet closure-type connections. In screw connections, an insertion movement is realized by the rotation of the participating threads relative to each other.

The connection device can advantageously comprise at least one connection element, in particular a thread, a rotation and/or insertion connection, in particular a screw connection or a bayonet closure-type connection.

Advantageously, the separating apparatus can be embodied as a so-called spin-on device, in particular spin-on filter, also known as an exchangeable screw-on filter. In this manner, it can be simply screwed on the connection head and correspondingly removed therefrom by unscrewing.

Advantageously, the at least one separating medium can comprise at least one coalescence medium. The at least one separating medium can be part of a separating insert, in particular coalescence insert.

Advantageously, the at least one separating medium can surround circumferentially an interior and/or the connection axis. The at least one separating medium, in particular the separating insert, can be realized advantageously in connection with a so-called round filter element.

Advantageously, the separating apparatus can be used in connection with machines in which gas, in particular air, is contaminated with oil, wherein the gas is to be freed again from the oil with the separating apparatus. Advantageously, the separating apparatus can be used in connection with in particular oil-lubricated compressors, internal combustion engines, air/oil separator boxes and the like.

In an advantageous embodiment, the pipe section can extend exclusively in the housing interior of the housing. In this manner, a corresponding space requirement at the outer side of the housing can be reduced. In contrast thereto, the nipple known from the prior art extends also outside of the container interior. The connection socket on the part of the connection head can be designed according to the invention significantly shorter than the nipple known from the prior art. In this manner, material, in particular metal, can be saved.

In a further advantageous embodiment, the pipe section can be connected with a fastening end directly or indirectly, in particular fixedly, to the housing. In this manner, the pipe section can be separable only destructively from the separating apparatus. The separating apparatus including the pipe section can be produced, mounted, and exchanged more easily.

Alternatively or additionally, the pipe section can be directly or indirectly, in particular fixedly, connected to a separating insert of the separating apparatus which is arranged in the housing. In this manner, the pipe section can be produced and/or mounted together with the separating insert.

In a further advantageous embodiment, the free end of the pipe section can project past a radially outer circumferential wall of the liquid collection chamber in axial direction in relation to the connection axis. In this manner, for stronger gas flows, it can be prevented that liquid collected in the liquid collection chamber can splash across the free rim of the pipe section and flow into the at least one gas outlet.

In a further advantageous embodiment, the at least one gas outlet can be designed as a connection receptacle for a connection socket, wherein the connection socket is connected or can be connected fixedly or separably to the connection head. In this manner, in a space-saving way the flow-through function and the holding function can be combined with each other. In the connection receptacle, the connection socket can be introduced with a rotation and/or insertion movement.

In a further advantageous embodiment, an inner diameter of the pipe section, at least in the region of its fastening end, can be larger than an inner diameter of the at least one gas outlet. In this manner, turbulences of the gas flow can be reduced, in particular avoided, at the transition location between the pipe section and the gas outlet.

Advantageously, an inner diameter of the pipe section at least in the region of its fastening end can be larger than an inner diameter of a connection socket. In this manner, turbulences can be further reduced.

In a further advantageous embodiment, the pipe section can be of plastic material. In this manner, the pipe section can be realized simpler, less expensively, and/or with a reduced weight than in case of pipe sections of metal. The use of plastic material is possible because significantly smaller mechanical forces are acting at the pipe section than at the nipple that is known from the prior art.

In a further advantageous embodiment, the at least one gas outlet can be arranged coaxially to the connection axis. In this manner, a connection socket on the part of the connection head can be introduced with the rotation and/or insertion movement about the connection axis into the at least one gas outlet, which then can act as a connection receptacle.

Advantageously, the at least one gas outlet can be designed of a circular shape. In this manner, the at least one gas outlet is of rotational symmetry, which is particularly advantageous for a screw connection.

In a further advantageous embodiment, a part of the housing surrounding the at least one gas outlet can comprise a mechanical connection element of the connection device. In this manner, the mechanical connection element can be realized simply and, in a space-saving manner. The mechanical connection element can be connected in this way force-transmittingly directly to the housing. In this manner, the pipe section can be kept free of connection forces between the housing and the connection head. The functional separation between the pipe section and the mechanical connection element can thus be ensured.

Advantageously, the mechanical connection element can be a thread or a part of a bayonet closure-type connection.

Advantageously, the at least one gas outlet can be surrounded by an inner thread. The inner thread can interact in a simple manner with a corresponding outer thread on the part of the connection head, in particular at a connection socket on the part of the connection head.

In a further advantageous embodiment, at least one gas inlet can lead on the same side into the housing at which the liquid drain and the at least one gas outlet lead out of the housing. In this manner, all fluid connections can be arranged at the same side of the housing. This simplifies the connection of the separating apparatus to the connection head.

Advantageously, the at least one liquid drain can be arranged between the at least one gas outlet and the at least one gas inlet. In this manner, the liquid drain can be arranged in a space-saving manner in the vicinity of the at least one gas outlet. In this way, the corresponding fluid channels on the part of the connection head can be realized in a more space-saving way.

In a further advantageous embodiment, the at least one gas outlet and the at least one liquid drain can be surrounded by at least one annular seal device. In this manner, the at least one gas outlet and the at least one liquid drain can be sealed in outward direction and/or toward the at least one gas inlet.

In a further advantageous embodiment, at least one seal device can be arranged between the at least one liquid drain and the at least one gas inlet. In this manner, the at least one liquid drain can be separated fluid-tightly from the at least one gas outlet. In this way, it can be prevented that separated liquid can flow back into the purified gas.

The object is solved for the separating system according to the invention in that the pipe section is separated functionally from the mechanical force-transmitting connection elements of the connection device.

In other respects, the features and advantages which have been explained in connection with the separating apparatus according to the invention and the separating system according to the invention and their respective advantageous embodiments apply correspondingly mutually and vice versa. The individual features and advantages can, of course, be combined among each other, wherein further advantageous effects may result that go beyond the sum of the individual effects.

BRIEF DESCRIPTION OF THE DRAWINGS

Further advantages, features, and details of the invention result from the following description in which embodiments of the invention will be explained in more detail with the aid of the drawing. A person of skill in the art will consider the features disclosed in combination in the drawing, the description, and the claims expediently also individually and combine them to expedient further combinations. The Figures show schematically embodiments of the invention.

In the Figures, same components are identified with same reference characters.

DESCRIPTION OF PREFERRED EMBODIMENTS

Figure 1:
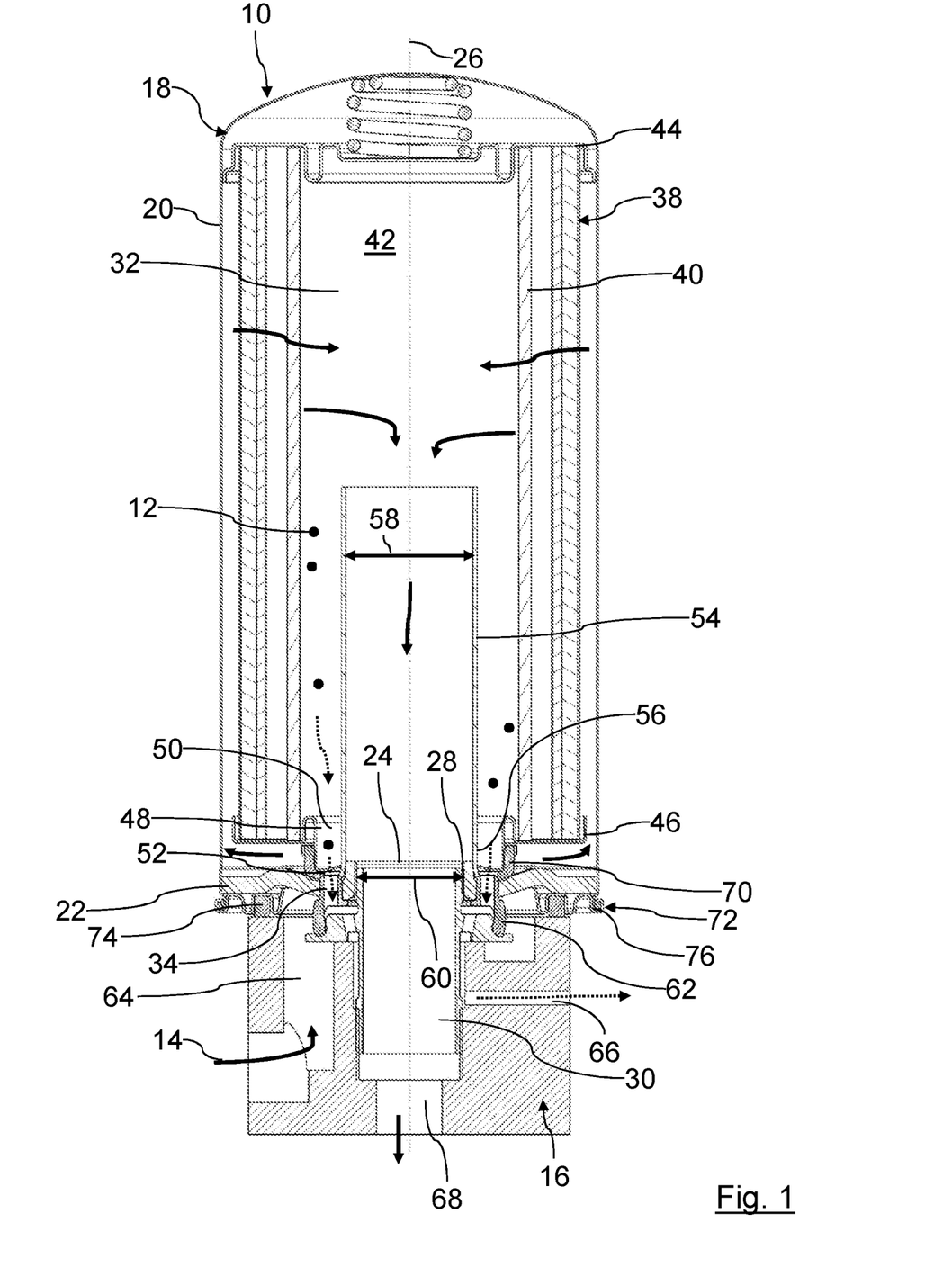
FIG. 1 shows a longitudinal section of a separating apparatus for separating liquid from gas according to a first embodiment, which is arranged separably at a connection head of a machine.
Figure 2:
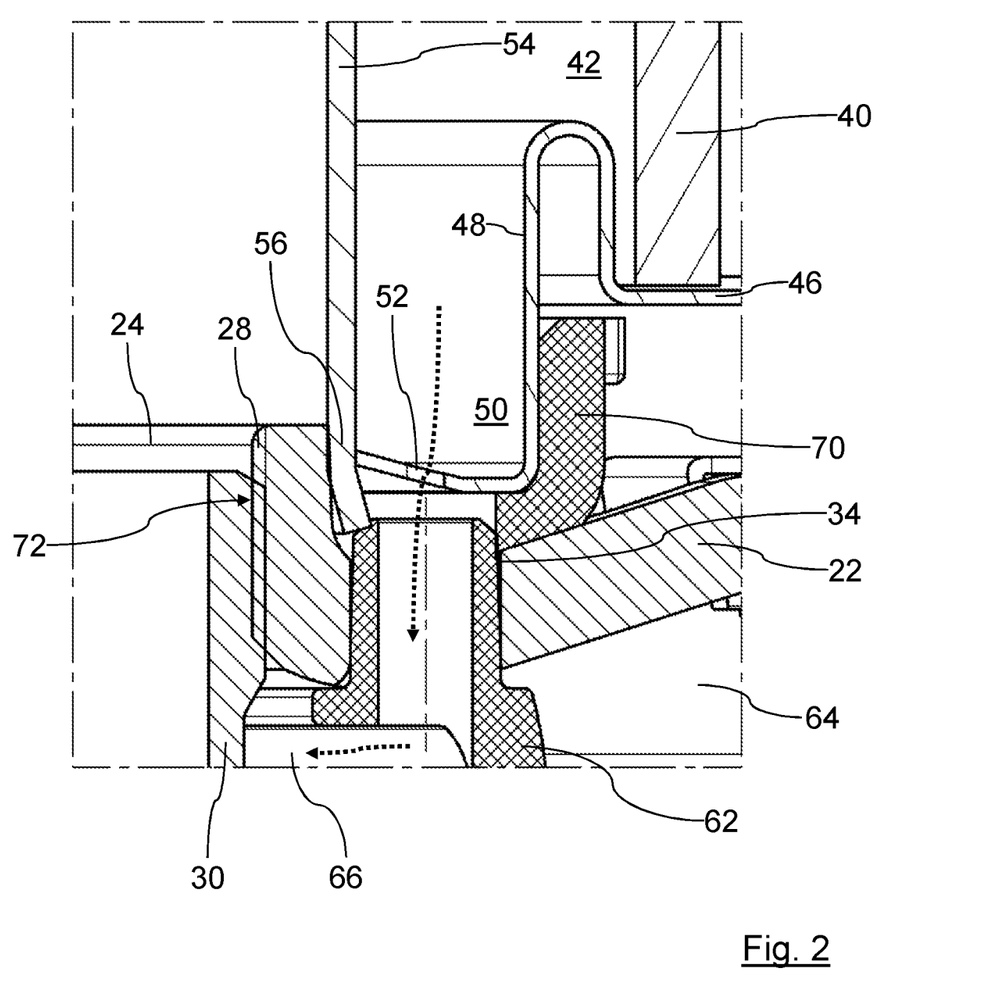
FIG. 2 shows a detail illustration of the longitudinal section of FIG. 1 in the region of a housing cover of the separating apparatus.
Figure 3:
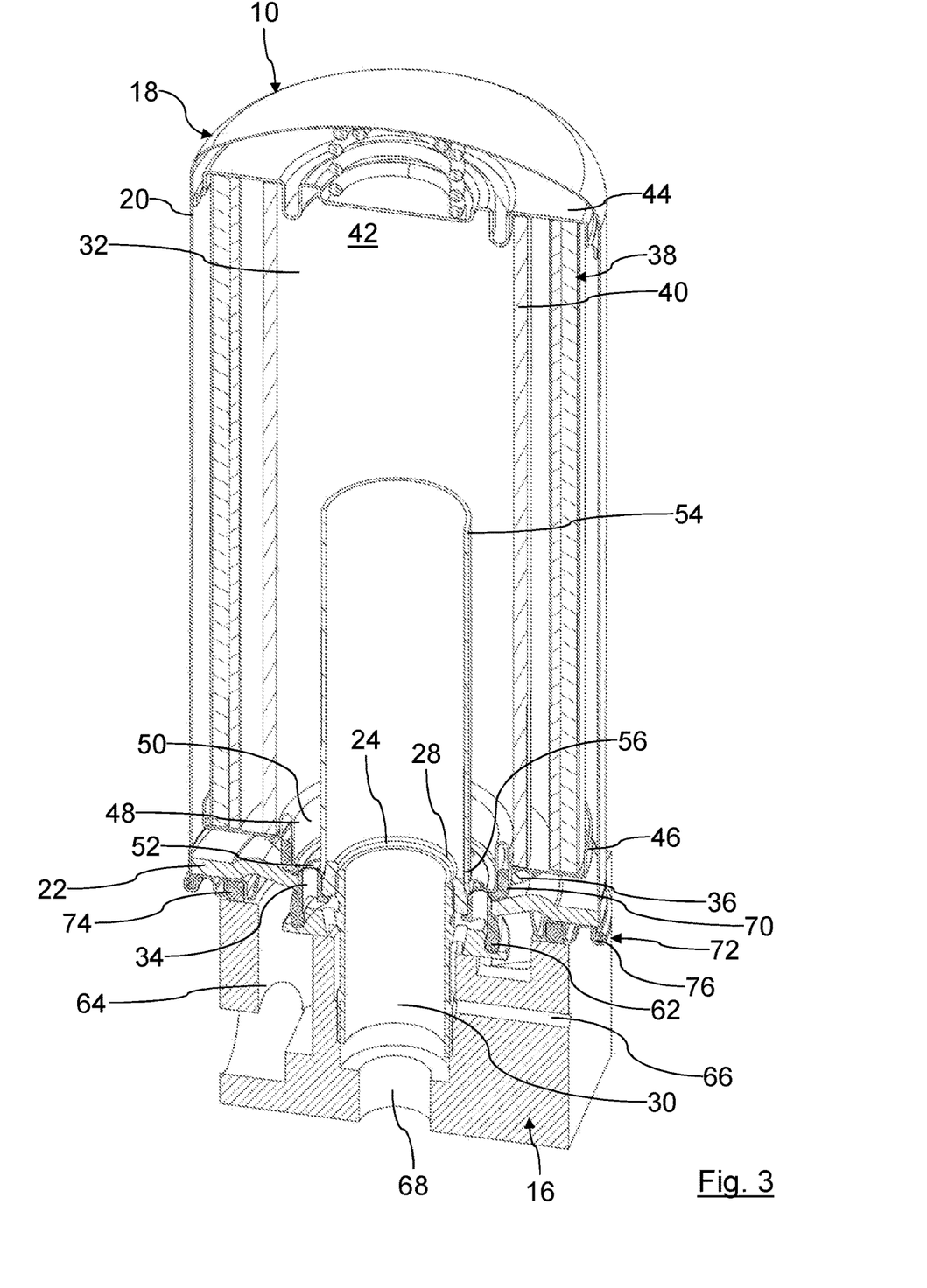
FIG. 3 shows an isometric illustration of the sectioned separating apparatus at the connection head of FIG. 1.

In FIGS. 1 to 3, a separating apparatus 10 for liquid, for example, oil 12, from gas 14, for example, air, according to a first embodiment is illustrated in longitudinal section, in a detail view, and in an isometric illustration. The separating apparatus 10 is detachably connected, for example, to a connection head 16 of a machine that is not illustrated otherwise, in particular an oil-lubricated compressor. With the separating apparatus 10, the compressor gas 14 is freed from oil 12. In the normal operating position, the separating apparatus 10 is arranged spatially in accordance with FIG. 1. In this context, the separating apparatus 10 is located spatially at the top in the normal operating position and the connection head 16 spatially at the bottom.

The separating apparatus 10 comprises a housing 18. The housing 18 comprises a cup-shaped housing pot 20 having an open side which in normal operating position is located spatially at the bottom and is closed by a housing cover 22. The housing cover 22 is connected by means of a crimp connection, not of interest here, seal-tightly to the housing pot 20.

The housing cover 22 comprises a central opening which serves as a gas outlet 24 for gas 14 freed from oil 12. The gas outlet 24 is circular and coaxial to a virtual connection axis 26.

When in the description "radial", "coaxial", "axial", "tangential", "circumferential", "concentric", "eccentric" or the like is referred to, this relates to the connection axis 26 if nothing else is mentioned.

A radially inner section of the housing cover 22 which surrounds the gas outlet 24 is of a circular cylindrical shape and extends coaxially in a housing interior 32 of the housing 18. The radially inner circumferential side of the housing cover 22, respectively of the circular cylindrical radially inner section, comprises an inner thread 28. The gas outlet 24 serves additionally as a connection receptacle for a connection socket 30 which is fastened on the part of the connection head 16.

Radially outwardly, the gas outlet 24 is surrounded by a plurality of oil drains 34. The oil drains 34 are arranged circumferentially distributed. The oil drains 34 lead through the housing cover 22, respectively.

Moreover, a plurality of gas inlets 36 leads through the housing cover 22. In FIG. 3, one of the gas inlets 36 can be seen in an exemplary fashion. The gas inlets 36 are located in a ring section of the housing cover 22 which surrounds radially outwardly the oil drains 34.

In the housing 18, an oil separating insert 38 is arranged. The oil separating insert 38 as a whole is of a circular cylindrical configuration in an exemplary fashion and coaxially arranged. The oil separating insert 38 comprises a separating medium 40 for the oil 12. The oil separating medium 40 can be designed, for example, as a so-called coalescence medium. In this way, the oil separating insert 38 as a whole can be realized as a coalescence insert. The separating medium 40 surrounds circumferentially continuously an insert interior 42 of the oil separating insert 38.

At the side which is axially facing away from the housing cover 22, the oil separating insert 38 is provided with an upper end disk 44 with which the insert interior 42 is closed off thereat.

At the axially oppositely positioned side which is facing the housing cover 22, the oil separating insert 38 comprises a connection end disk 46. The connection end disk 46 comprises a coaxial opening which is larger than the gas outlet 24.

The connection end disk 46 is bent multiple times in a radially inner section in which it is overlapping the insert interior 42 so that it forms a radially outer circumferential wall 48 for an oil collection chamber 50. In the oil collection chamber 50, separated oil 12 that sinks downwardly following the force of gravity can be collected. Through openings 52 are arranged in the bottom of the oil collection chamber 50. With installed oil separating insert 38, the through openings 52 correspond with the corresponding oil drains 34. Through the through openings 52, the oil 12 can flow out of the oil collection chamber 50 into the oil drains 34.

The oil separating insert 38 as a whole is arranged in the housing 18 such that the separating medium 40 separates the gas inlets 36 from the gas outlet 24. In this manner, the gas 14 must flow through the separating medium 40 and is freed thereby from the oil 12.

The insert interior 42, the oil collection chamber 50, the through openings 52, and the oil drains 34 are arranged at the clean gas side of the oil separating insert 38.

A pipe section 54 extends coaxially in the housing interior 32, respectively, the insert interior 42. The pipe section 54 is of a circular cylindrical shape in an exemplary fashion. The pipe section 54 comprises a connection end 56 with which it is fastened at a radially outer circumferential side of the radially inner section of the housing cover 22 that is of a circular cylindrical shape. A seal, not illustrated, is arranged between the connection end 56 and the radially inner section of the housing cover 22.

The pipe section 54 extends in axial direction approximately across half of the axial height of the insert interior 42. It projects thus past the circumferential wall 48 of the oil collection chamber 50 in the axial direction. By means of the pipe section 54, it is prevented that the oil 12 collected in the oil collection chamber 50 can flow into the gas outlet 24.

The connection end 56 is arranged in this context radially between the radially inner section which surrounds the gas outlet 24, on the one hand, and the through openings 52 and the oil drains 34, on the other hand.

An inner diameter 58 of the pipe section 54 is larger than an inner diameter 60 of the gas outlet 24 and larger than an inner diameter of the connection receptacle for the connection socket 30. Moreover, the inner diameter 58 of the pipe section 54 is larger than the inner diameter of the connection socket 30. In this manner, turbulences can be avoided as the gas 14 freed from oil 12 flows out.

On the outer side of the housing cover 22 that is axially facing away from the housing interior 32, a first seal 62 extends circumferentially about the oil drains 34. In this context, the first seal 62 comprises in the region of the oil drains 34 a hollow cylinder section, respectively, which extends through the respective oil drain 34. On the side that is axially facing away from the housing cover 22, the first seal 62 is provided radially outwardly with a hollow cylinder section which extends in axial direction away from the housing cover 22.

With the first seal 62, the clean gas side is sealed against the oil drains 34 and the oil collection chamber 50 in the region of the gas outlet 24. The seal 62 is oriented in the direction toward the connection head 16 and, for obtaining the sealing function, contacts preferably radially or even axially seal-tightly the connection head, preferably, as illustrated, the connection socket 30. Moreover, when the separating apparatus 10 is mounted, the first seal 62 seals the oil drains 34 against a raw gas-side gas supply channel 64 in the connection head 16.

The gas supply channel 64 corresponds, when the separating apparatus 10 is mounted, with the gas inlets 36 of the separating apparatus 10. The oil drains 34 correspond, when the separating apparatus 10 is mounted, with an oil drain channel system 66 of the connection head 16. The connection socket 30 is hollow inside and forms thus a part of a gas discharge channel 68 of the connection head 16.

An annular second seal 70 is arranged moreover in the housing interior 32 between the connection end disk 46 and the housing cover 22. The second seal 70 surrounds radially outwardly the oil collection chamber 50, the through openings 52, and the oil drains 34. The second seal 70 separates the raw gas side of the oil separating insert 38 from the oil drains 34 and from the clean gas side. In operation, oil drains 34 and clean gas side comprise the same or a similar pressure level, which is lower compared to the raw gas side. The second seal 70 is positioned with its radially inner circumferential side at the hollow cylindrical sections of the first seal 62.

The gas outlet 24 with the inner thread 28, designed as a connection receptacle, forms a connection device 72 with which the separating apparatus 10 can be connected to the connection head 16.

The separating apparatus 10 comprises moreover an outer annular seal 74 which is located at the outer side of the housing 18 that is facing the connection head 16. The annular seal 74 is arranged in a corresponding seal groove at a connection plate 76. With the outer annular seal 74, the oil drains 34, the gas inlets 36, and the gas outlet 24 are sealed in relation to the environment. The outer annular seal 74 is positioned for this purpose in axial direction seal-tightly at a corresponding seal surface on the part of the connection head 16.

The connection plate 76 is located at the outer side of the housing cover 22 which is axially facing away from the housing interior 32. With the connection plate 76, the crimp connection of the housing cover 22 with the housing pot 20 is realized. The housing cover 22 is fixed with tabs—not of interest in this context—of the connection plate 76.

For connecting the separating apparatus 10 to the connection head 16, the separating apparatus 10 is screwed, with the housing cover 22 leading, onto the connection socket 30 of the connection head 16. In this context, a corresponding outer thread on the part of the connection socket 30 engages the inner thread 28 on the part of the gas outlet 24. Upon screwing, the first seal 62 and the outer annular seal 74 are automatically brought into engagement with corresponding seal surfaces on the part of the connection head 16. A separation of the separating apparatus 10 from the connection head 16 is realized by unscrewing in reverse rotational direction.

In operation of the separating apparatus 10, gas 14 contaminated with oil 12 is guided through the gas supply channel 64 of the connection head 16 and the gas inlets 36 into the housing interior 32 to the raw side of the oil separating insert 38. The gas 14 that is to be freed from oil 12 flows through filter media, not of interest here and surrounding the separating medium 40 circumferentially continuously, and the separating medium 40 from the exterior to the interior in radial direction and reaches the insert interior 42. In doing so, gas 14 is freed from oil 12. The separated oil 12 sinks downwardly, following the force of gravity, in the insert interior 42 into the oil collection chamber 50. The collected oil 12 flows through the oil drains 34 out of the separating apparatus 10 and is supplied to the oil drain channel 66 of the connection head 16. The gas 14 that has been freed from oil 12 flows into the pipe section 54 and from there through the gas outlet 24 into the gas discharge channel 68 of the connection head 16.

Figure 4:
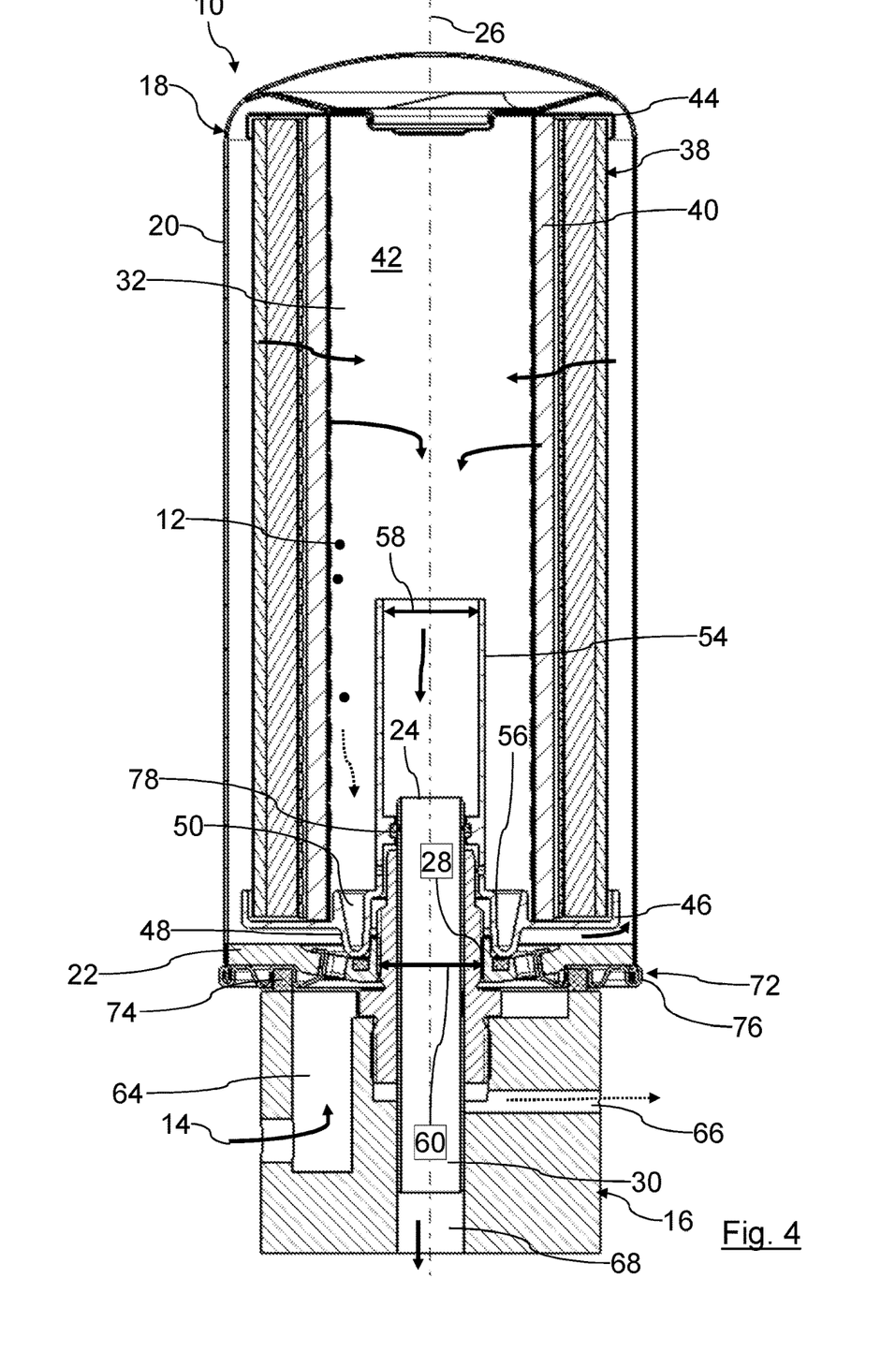
FIG. 4 shows a longitudinal section of a separating apparatus for separating liquid from gas according to a second embodiment.

In FIG. 4, a second embodiment of the separating apparatus 10 is illustrated. Those elements that are similar to those of the first embodiment of FIGS. 1 to 3 are provided with the same reference characters. The second embodiment differs from the first embodiment in that the pipe section 54 is connected with its connection end 56 as one piece with the circumferential wall 48 of the oil collection chamber 50. In this context, the connection end 56 delimits the oil collection chamber 50 radially inwardly. The pipe section 54 is connected through the circumferential wall 48 as one piece with the connection end disk 46. In this manner, the pipe section 54 is connected to the oil separating insert 38. Moreover, the connection socket 30 extends into the housing interior 32 of the housing 18. In this context, the pipe section 54 projects past the connection socket 30 in axial direction. An annular seal 78 is arranged between the radially outer circumferential side of the connection socket 30 and the radially inner circumferential side of the pipe section 54.

Moreover, a drainage line that is hidden in FIG. 4 and therefore not illustrated extends adjacent to the radially outer circumferential side of the connection socket 30. The drainage line extends in axial direction and connects the raw gas side to the oil drain channel 66.

Figure 5:
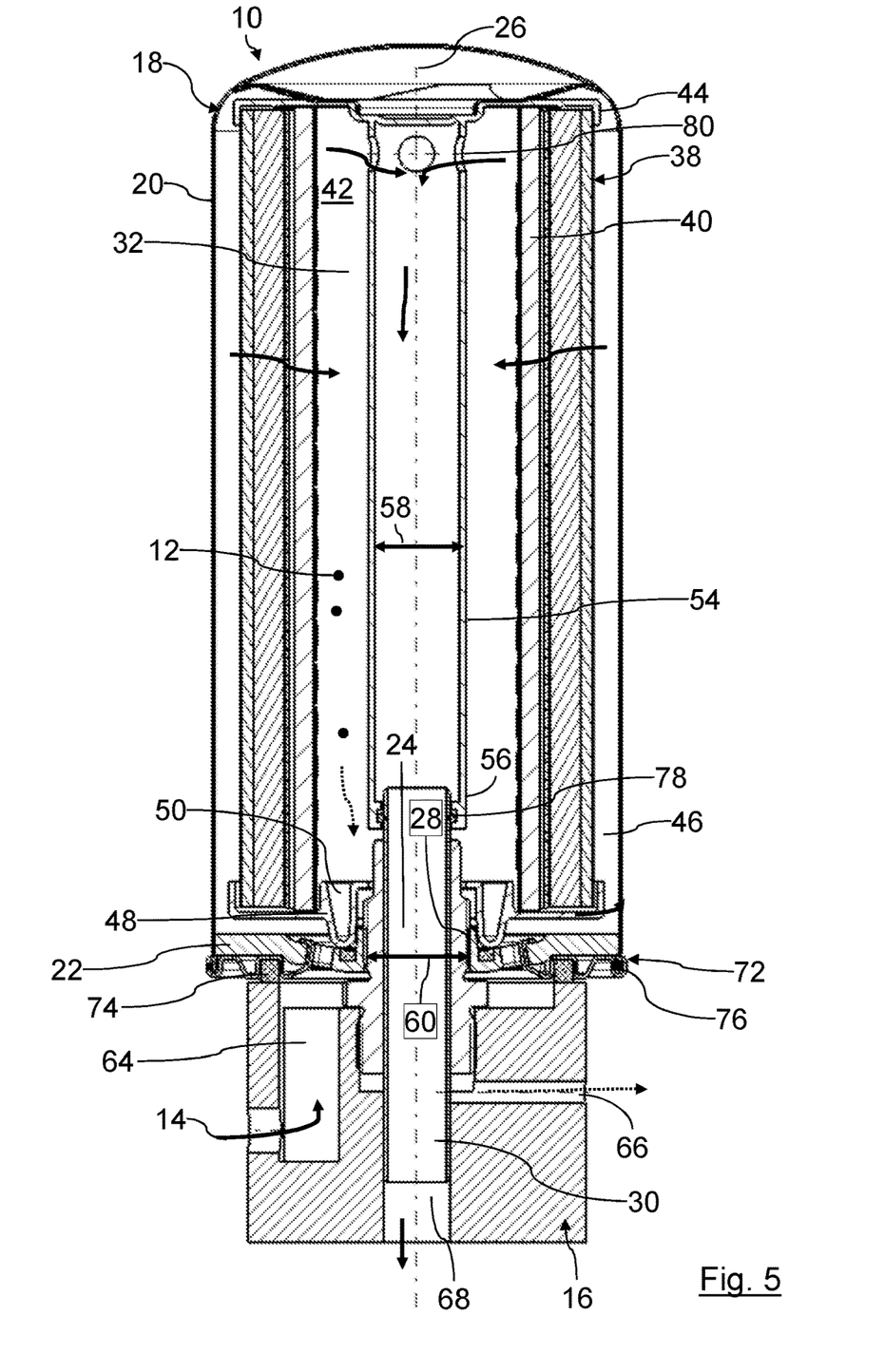
FIG. 5 shows a longitudinal section of a separating apparatus for separating liquid from gas according to a third embodiment.

In FIG. 5, a third embodiment of the separating apparatus 10 is illustrated. Those elements that are similar to those of the first embodiment of FIGS. 1 to 3 are provided with the same reference characters. The third embodiment differs from the first embodiment in that the pipe section 54 with its connection end 56 is pushed onto the connection socket 30. In this context, the connection socket 30 extends into the housing interior 32 of the housing 18. The pipe section 54 is connected by connection socket 32 to the housing 18. An annular seal 78 is arranged between the radially outer circumferential side of the connection socket 30 and the radially inner circumferential side of the pipe section 54.

Moreover, the pipe section 54 extends to the upper end disk 44 of the oil separating insert 38. With its end thereat, the pipe section 54 is connected as one piece to the upper end disk 44 and connected in this way to the oil separating insert 38. The axial end face of the pipe section 54 on the side of the upper end disk 44 is closed. At its circumferential wall below the end disk 44, the pipe section 54 comprises a plurality of through openings 80 for gas.

Moreover, a drainage line which is hidden in FIG. 5 and therefore not illustrated extends adjacent to the radially outer circumferential side of the connection socket 30. The drainage line extends in axial direction and connects the clean gas side to the oil drain channel 66.

What is claimed is:

1. A separating apparatus for separating liquid from gas, the separating apparatus comprising:
    a housing comprising a housing cover comprising a central opening configured to connect separably the separating apparatus by a rotation and/or insertion movement in relation to a virtual connection axis to a connection head of a machine;
    the housing further comprising at least one gas inlet for a gas to be freed from a liquid;
    the housing further comprising at least one gas outlet for the gas freed from the liquid, wherein the central opening of the housing cover serves as the at least one gas outlet and the at least one gas outlet surrounds circumferentially the virtual connection axis:
    the housing further comprising at least one liquid drain for the liquid that has been separated;
    at least one separating medium that can be flowed through by the gas arranged inside the housing so as to separate the at least one gas inlet from the at least one gas outlet in relation to a flow of the gas through the housing;
    a liquid collection chamber arranged inside the housing at a clean gas side of the at least one separating medium so as to surround circumferentially the virtual connection axis and the at least one gas outlet;
    wherein the at least one liquid drain leads out of the liquid collection chamber;
    wherein the at least one gas outlet and the at least one liquid drain lead out of the housing at a side of the housing at which the housing cover is arranged;
    a pipe section arranged inside the housing so as to surround circumferentially the virtual connection axis and form at least partially a radially inner boundary of the liquid collection chamber, wherein the pipe section leads to the at least one gas outlet, and wherein an inner diameter of the pipe section is larger than an inner diameter of the at least one gas outlet;
    wherein the pipe section is functionally separated from mechanical force-transmitting connection elements of the housing cover and the connection head of the machine.

2. The separating apparatus according to claim 1, wherein the pipe section extends exclusively in a housing interior of the housing.

3. The separating apparatus according to claim 1, wherein the pipe section comprises a connection end that is connected directly or indirectly to the housing cover.

4. The separating apparatus according to claim 1, further comprising a separating insert arranged inside the housing, and wherein the pipe section comprises a connection end that is connected directly or indirectly to the separating insert.

5. The separating apparatus according to claim 1, wherein the pipe section comprises a free end projecting past a radially outer circumferential wall of the liquid collection chamber in an axial direction in relation to the virtual connection axis.

6. The separating apparatus according to claim 1, wherein the at least one gas outlet is a connection receptacle configured to receive a connection socket of the connection head.

7. The separating apparatus according to claim 1, wherein the pipe section is of plastic material.

8. The separating apparatus according to claim 1, wherein the at least one gas outlet is arranged coaxially to the virtual connection axis.

9. The separating apparatus according to claim 1, wherein the housing cover of the housing comprises a mechanical connection element, and wherein the mechanical connection element is a radially inner section of the housing cover surrounding the at least one gas outlet.

10. The separating apparatus according to claim 1, wherein the at least one gas inlet leads into the housing at the side of the housing at which the housing cover is arranged.

11. The separating apparatus according to claim 1, further comprising at least one annular seal surrounding the at least one gas outlet and the at least one liquid drain.

12. The separating apparatus according to claim 1, further comprising at least one seal device arranged between the at least one liquid drain and the at least one gas inlet.

13. A separating system of a machine, the separating system comprising:
  at least one separating apparatus for separating liquid from gas, the separating apparatus comprising:
    a housing comprising a housing cover comprising a central opening configured to connect separably the separating apparatus by a rotation and/or insertion movement in relation to a virtual connection axis to a connection head of a machine;
    the housing further comprising at least one gas inlet for a gas to be freed from a liquid;
    the housing further comprising at least one gas outlet for the gas freed from the liquid, wherein the central opening of the housing cover serves as the at least one gas outlet and the at least one gas outlet surrounds circumferentially the virtual connection axis;
    the housing further comprising at least one liquid drain for the liquid that has been separated;
    at least one separating medium that can be flowed through by the gas arranged inside the housing so as to separate the at least one gas inlet from the at least one gas outlet in relation to a flow of the gas through the housing;
    a liquid collection chamber arranged inside the housing at a clean gas side of the at least one separating medium so as to surround circumferentially the virtual connection axis and the at least one gas outlet;
    wherein the at least one liquid drain leads out of the liquid collection chamber;
    wherein the at least one gas outlet and the at least one liquid drain lead out of the housing at a side of the housing at which the housing cover is arranged;
    a pipe section arranged inside the housing so as to surround circumferentially the virtual connection axis and form at least partially a radially inner boundary of the liquid collection chamber, wherein the pipe section leads to the at least one gas outlet, and wherein an inner diameter section is larger than an inner diameter of the at least as outlet;
  a connection head for connecting the at least one separating apparatus to the machine, wherein the connection head comprises a connection socket connected separably to the housing cover of the housing of the separating apparatus;
  wherein the pipe section is functionally separated from mechanical force-transmitting connection elements of the housing cover of the housing of the separating apparatus and the connection socket of the connection head.

* * * * *